(12) United States Patent
Berger et al.

(10) Patent No.: US 8,904,861 B2
(45) Date of Patent: Dec. 9, 2014

(54) MEASURING DEVICE

(75) Inventors: Andreas Berger, Hasel-Glashutten (DE); Michal Bezdek, Aesch (SE); Arno Lang, Mullheim (DE)

(73) Assignee: Endress + Hauser Flowtec AG, Reinach (CH)

( * ) Notice: Subject to any disclaimer, the term of this patent is extended or adjusted under 35 U.S.C. 154(b) by 23 days.

(21) Appl. No.: 13/510,660

(22) PCT Filed: Oct. 14, 2010

(86) PCT No.: PCT/EP2010/065473
§ 371 (c)(1), (2), (4) Date: May 18, 2012

(87) PCT Pub. No.: WO2011/061021
PCT Pub. Date: May 26, 2011

(65) Prior Publication Data
US 2012/0227496 A1  Sep. 13, 2012

(30) Foreign Application Priority Data
Nov. 19, 2009 (DE) .......................... 10 2009 046 886

(51) Int. Cl.
*G01F 19/00* (2006.01)
*G01F 1/66* (2006.01)

(52) U.S. Cl.
CPC ................ *G01F 1/667* (2013.01); *G01F 1/662* (2013.01)
USPC ..................... 73/426; 73/427; 73/428; 73/429

(58) Field of Classification Search
USPC .................................................... 73/847, 426
See application file for complete search history.

(56) References Cited

U.S. PATENT DOCUMENTS

| 3,964,308 | A | * | 6/1976 | Scarpa | ........................ | 73/861.27 |
| 4,823,612 | A | * | 4/1989 | Ichino | ........................ | 73/861.18 |
| 5,962,790 | A | * | 10/1999 | Lynnworth et al. | ............. | 73/644 |
| 7,044,001 | B2 | * | 5/2006 | Sylvia et al. | ............... | 73/861.29 |
| 7,614,309 | B2 | * | 11/2009 | Rieder et al. | ............... | 73/861.27 |
| 7,752,919 | B2 | * | 7/2010 | Straub et al. | ............... | 73/861.29 |

(Continued)

FOREIGN PATENT DOCUMENTS

| DE | 2318060 | | 10/1974 |
| DE | 4439399 | A1 | 5/1996 |

(Continued)

OTHER PUBLICATIONS

International Preliminary Report on Patentability and Written Opinion in corresponding PCT Application No. PCT/EP2010/065473, dated Jun. 12, 2012.

(Continued)

*Primary Examiner* — Eric S McCall
*Assistant Examiner* — Jamel Williams
(74) *Attorney, Agent, or Firm* — Bacon & Thomas, PLLC

(57) ABSTRACT

A method for the manufacture of a measuring device, and a measuring device for registering at least one measured value of at least one process variable, wherein the measuring device includes a measuring tube, which has at least one necked out portion, on which at least one measuring transducer is arranged, wherein the measuring tube together with the necked out portion is monolithic, and wherein the necked out portion is manufacturable from the measuring tube at least partially by a deformation method.

15 Claims, 2 Drawing Sheets

(56) References Cited

U.S. PATENT DOCUMENTS

2004/0011141 A1* 1/2004 Lynnworth ............... 73/861.27
2006/0278015 A1* 12/2006 Wiest et al. ............... 73/861.18
2011/0120229 A1* 5/2011 Kossek et al. ............. 73/861.18

FOREIGN PATENT DOCUMENTS

| DE | 10153297 | A1 | 4/2003 |
| DE | 10220422 | A1 | 8/2003 |
| DE | 10249542 | A1 | 5/2004 |
| DE | 10324454 | B3 * | 11/2004 |
| DE | 102004028078 | A1 | 1/2006 |
| DE | 102008055030 | A1 | 7/2010 |
| EP | 1482249 | A1 | 12/2004 |
| WO | 2010/069869 | A1 | 6/2010 |

OTHER PUBLICATIONS

German Search Report in corresponding German Application No. 10 2009 046 886.2, dated Sep. 27, 2010.
International Search Report in corresponding PCT Application No. PCT/EP2010/065473, dated Feb. 7, 2011.

* cited by examiner

MEASURING DEVICE

TECHNICAL FIELD

The present invention relates to a measuring device and a manufacturing process for the manufacture of such a measuring device, wherein a measuring tube has at least one necked out portion, with which a measuring transducer is connectable.

BACKGROUND DISCUSSION

Various measuring devices have become known, especially in flow measurement by means of ultrasound or in thermal flow measurement, which exhibit measuring transducers mounted on measuring tubes. Both U.S. Pat. No. 4,742,717 as well as also U.S. Pat. No. 4,823,612 show sleeves for accommodating measuring transducers, wherein the sleeves are welded with the measuring tube. Also U.S. Pat. No. 5,693,892 and U.S. Pat. No. 5,962,790 show sensor nozzles connected as apparently one piece with the measuring tube.

If the sensor nozzles are welded onto the measuring device, a large disadvantage, in such case, is that for measuring tubes with different tube diameters, different sensor nozzles must also be used. On the other hand, primary forming methods have become known for producing measuring tubes with sensor nozzles in the form of necked out portions monolithically in one manufacturing process. However, primary formed measuring tubes most often require very complex subsequent working. Also in the forming of very thin measuring tubes or in the case of selected materials, a primary forming method, e.g. casting, is not readily possible.

SUMMARY OF THE INVENTION

An object of the invention is to provide a cost-effectively manufactured measuring device, especially a flow measuring device.

The object is achieved by a measuring tube, which has at least one necked out portion, on which at least one measuring transducer is arranged for registering at least one measured value of at least one process variable, wherein: said measuring tube together with said necked out portion is monolithic; and said necked out portion is manufacturable from said measuring tube at least partially by a deformation method.

Besides the many classic form converting methods, also collar drawing is known as a cold forming method. Deformation methods in general and collar drawing in particular are known to those skilled in the art.

The invention lends itself to numerous forms of embodiment. Several of these will now be briefly explained here in greater detail.

In order to manufacture a measuring device of the invention, a measuring tube must first be produced according to the method of the invention. The measuring tube includes at least one necked out portion, which is produced from the measuring tube, for example, via a cold forming method, e.g. collar drawing. In such case, the necked out portion includes a first interface, which is produced with a predetermined shape and size. Thus, a measuring transducer, which has a second interface, which is connectable with the first interface, can be connected with the measuring tube via the necked out portion. An advantage of the predetermined interfaces is that equally constructed measuring transducers are placeable on measuring tubes of various nominal diameters. These are simply placed on the interfaces of the necked out portions, or are connected with the latter. The manufacture of equal shapes and sizes for the interfaces is enabled by forming methods. Only a primary forming method would enable the manufacture of measuring tubes and corresponding measuring devices with predetermined interfaces on measuring tubes of different nominal diameters. However, especially in the case of metal measuring tubes, primary forming methods are considerably more complex and more expensive. With the method of the invention, at least two measuring tubes of different nominal diameters and each having at least one necked out portion with a first interface can thus be produced in such a manner, that the two first interfaces of the necked out portions of the at least two measuring tubes have an approximately identical shape and size. Due to the different tube curvatures in the case of different tube diameters and/or via the different wall thicknesses of the measuring tubes, the measuring transducer must have an interface in each case matched to the particular measuring tube, if the measuring transducer were to be arranged directly on the measuring tube, e.g. were to be directly welded onto the measuring tube, wherein previously, a bore would need to be made in the measuring tube wall.

A manufacturing process for manufacture of a measuring device with a measuring tube and at least one measuring transducer for registering at least one measured value of at least one process variable, especially the flow of a measured medium through the measuring tube, includes method steps for manufacture of the measuring tube, thus especially that at least one necked out portion of the measuring tube is produced by means of deforming the measuring tube, and furthermore that the measuring transducer is then connected with the necked out portion in a shape-interlocking, force-interlocking or material-bonded manner. In such case, the at least one necked out portion (3) is produced so as to have a first interface with a predetermined shape and size in such a manner, that the first interface of the necked out portion is connectable with a second interface of a predetermined shape and size of the at least one measuring transducer in material-bonded, force-interlocking or shape-interlocking manner. The measuring transducer is then connected via its second interface with the necked out portion on its first interface, e.g. the measuring transducer is welded onto the end of the necked out portion.

The necked out portion provides, for example, a first interface, e.g. by an end of the necked out portion having an elliptically, and especially approximately circularly, round cross section, and a predetermined nominal width, thus, for example, a predetermined nominal diameter, at the end of the necked out portion. Furthermore, the necked out portion can be produced with a predetermined wall thickness on the end, which is, for example, approximately constant along the periphery of the necked out portion. The measuring transducer is then produced as a second interface with an elliptically, especially an approximately circularly, round cross section, on a connection side of the measuring transducer and a predetermined nominal width, especially a predetermined nominal diameter, on the connection side of the measuring transducer, wherein the predetermined nominal widths of the connection side of the measuring transducer and of the end of the necked out portion are essentially identical. Certain tolerance deviations are naturally thinkable. Thus, the measuring transducer can easily be placed on and welded onto the necked out portion.

Besides a welded connection, other connection possibilities are also possible. Thus, a pressing of the measuring transducer into the necked out portion is possible, e.g. by the measuring transducer and the necked out portion having an interference fit and the measuring tube being heated and/or the measuring transducer being cooled before introduction of the measuring transducer into the necked out portion. Alternatively, an internal thread, for example, can be cut into the necked out portion and an external thread congruent thereto can be provided on the measuring transducer. In this way, an easy changing of the measuring transducer is enabled, since the measuring transducer is only screwed into the necked out portion. Equally constructed measuring transducers are, of course, not necessary; however, the measuring transducers must have essentially identical second interfaces.

If the necked out portions of the measuring tubes are produced by collar drawing, the same tool, for example, is also used for different measuring tubes with different nominal diameters and/or wall thicknesses. Besides this, methods using different tools are also known, which lead to the same result. Most often, in the case of collar drawing, a hole is drilled into the measuring tube wall and then the necked out portion is formed with a mandrel or a rotating tool from the measuring tube. Multistage forming processes have also become known. The necked out portion thus always bounds an opening in the measuring tube. This opening is, according to an embodiment of the invention, sealed by the measuring transducer arranged in the necked out portion.

A measuring device of the invention is manufacturable by a method of the invention. The measuring device includes a measuring tube, which has at least one necked out portion, on which at least one measuring transducer is arranged for registering at least one measured value of at least one process variable, wherein the measuring tube is manufacturable monolithically together with the necked out portion, and wherein the necked out portion is manufacturable from the measuring tube at least partially via a deformation method. The measuring tube has, for example, an elliptically, especially approximately circularly, round cross section, and is composed principally of metal or a metal alloy, especially stainless steel. Since the necked out portion is monolithic with the measuring tube, the necked out portion is, moreover, also made of the same material. Referred to as "monolithic" is that which is composed of one large piece, in contrast to being assembled from individual parts. The term "a necked out portion" refers to a necked out portion of a pipeline or tube. It is generally manufactured, for example, by casting or other primary forming methods, or by deforming the pipeline. A known forming method is collar drawing. In such case, a (for example elliptical) preliminary hole is first made in the pipeline. Then, a deforming tool for the necked out portion is drawn through the preliminary hole, out of the pipe. In such case, the material of the pipeline is drawn outwards and the necked out portion arises. Thereafter, the end of the necked out portion can be machined flat. A further pipe or tube, for example, could then soldered, brazed or welded onto the necked out portion.

The necked out portion always has a predetermined height above the measuring tube wall. This is especially important when the measuring transducer should be welded on. The necked out portion usually has a longitudinal axis, which lies approximately perpendicularly to a measuring tube axis. A cross section then extends transversely to this longitudinal axis.

Also the second interface of the measuring transducer can be produced from the same material as the measuring tube or the necked out portion, especially when the measuring transducer is welded onto the necked out portion. Both the necked out portion as well as also the measuring transducer then have an interface in each case with an elliptical, especially approximately circular, cross section on an approximately planar end, or connection side. Also the wall thicknesses on the end and/or connection side can be constant along its periphery.

In an embodiment of the invention, the measuring transducer protrudes at least partially into the necked out portion. This part is then at least partially contactable by a measured medium in the measuring tube. A good sterilizability of the measuring device is the result.

Ultrasonic transducers or temperature sensors of a thermal flow measuring device can especially be applied as the measuring transducer.

A measuring device can also have a plurality of necked out portions and measuring transducers. For example, two equally constructed, necked out portions are produced in a measuring tube and these are connected with two equally-constructed measuring transducers. Thus, two ultrasonic transducers for inline travel time difference measurement can be inserted into a measuring tube.

The invention will now be explained in greater detail on the basis of the appended drawing, in the figures of which an example of an embodiment is presented. Equal elements are provided in the figures with equal reference characters. The figures of the drawing show as follows:

DETAILED DISCUSSION IN CONJUNCTION WITH THE DRAWINGS

Figure 1A:
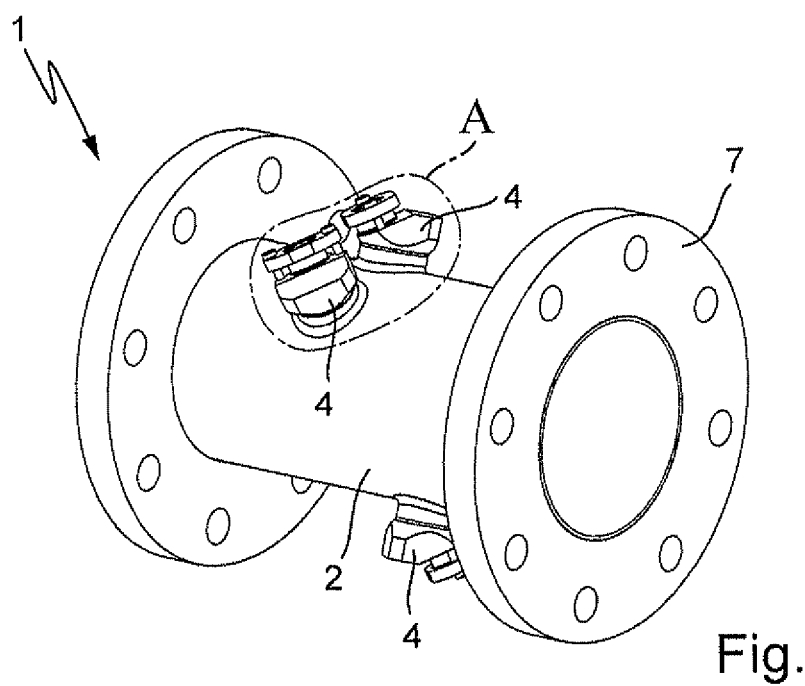
FIG. 1 a perspective view of an ultrasound flow measuring device of the invention.
Figure 1B:
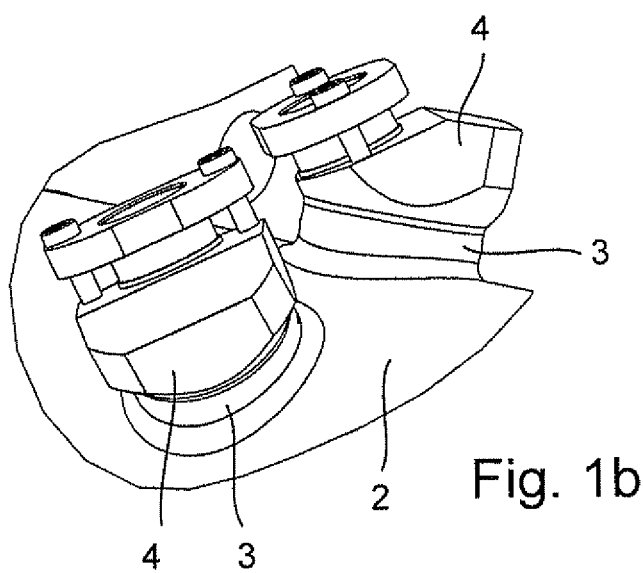

FIG. 1a shows inline ultrasound flow measuring device 1 of the invention three dimensionally. FIG. 1b shows the detail A. On a measuring tube 2 with two connection flanges 7, four ultrasonic transducers 4 are arranged as measuring transducers. These are here welded on necked out portions 3.

The necked out portions 3 were produced from the measuring tube 2 by deforming the measuring tube 2. With this method, an option is to manufacture equal necked out portions 3 for differently sized measuring tubes, and thereby to use equal measuring transducers on the measuring tubes of various sizes.

Figure 2A:
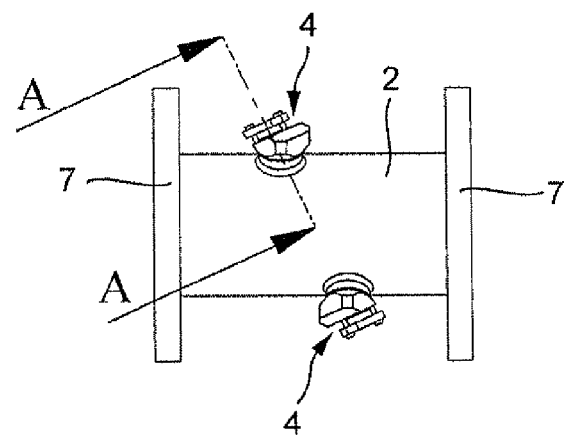
FIG. 2 is a detail view of the ultrasound-flow measuring device in section.
Figure 2B:
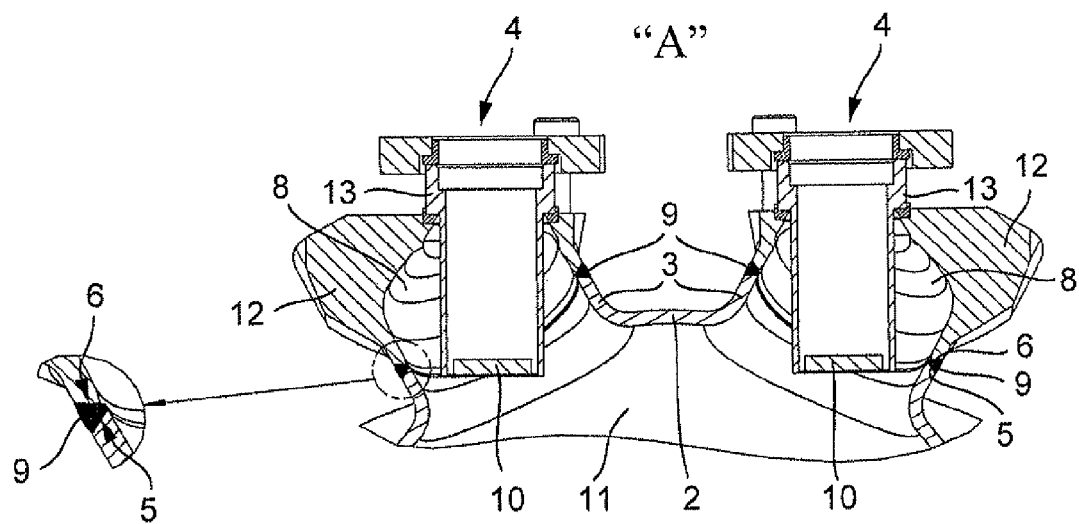

FIG. 2a and FIG. 2b show the detail A with a section through the two ultrasonic transducers 4 and the measuring tube 2. Ultrasonic transducers 4 have in this example of an embodiment not only equally embodied second interfaces 6, but also the entire ultrasonic transducers 4 are of equal construction. The embodiment is also unusual in that the ultrasonic transducers 4 are arranged inclined towards the measuring tube 2; i.e. the ultrasonic transducer elements 10, e.g. piezoelectric ceramic disks, transmit ultrasonic signals at an angle to a measuring tube axis not equal to 90° and not equal to 0°. Ultrasonic transducers 4 are connected with the necked out portions 3 of measuring tube 2 via the welded seams 9 by material bonding with measuring tube 2.

The necked out portions 3 have on their respective ends 5 a cross section which is in each case approximately circularly round, and which has a predetermined inner diameter and a predetermined wall thickness. Also the ultrasonic transducers 4 have on a connection side 6 a cross section which is in each case approximately circularly round and which has a predetermined inner diameter and a predetermined wall thickness, wherein here, the inner diameter of the necked out portion and of the measuring transducer on the respective end and connection side and the wall thicknesses are approximately equal. The end faces 5 and connection sides 6 are in each case flat, whereby these form suitable first and second interfaces. Due to the distance of end face 5 from the measuring tube wall, the ultrasonic transducers 4 are easily weldable.

Ultrasonic transducers 4 seal the openings in the measuring tube 2 bounded by the necked out portions 3. In such case, ultrasonic transducers 4 here likewise in each case have an inner space 8, in which the respective ultrasonic transducer element 10 is contactable by the measured medium in the measuring tube 2. In such case, the ultrasonic transducer elements 10 extend at least partially into the inner space 11 of the measuring tube. Besides ultrasonic transducers 4, other measuring transducers are also connectable to the necked out portions, such as, for example, temperature sensors.

The ultrasonic transducers 4 comprise in this example an ultrasonic transducer nozzle or measuring transducer nozzle 12, and an ultrasonic transducer holding element 13. The ultrasonic transducer holding element separates the ultrasonic transducer element 10 from the measured medium. Measuring transducer nozzle 12 includes the connection side 6 and is welded onto necked out portion 3. Measuring transducer nozzle and ultrasonic transducer holding element 13 are here likewise connected with one another in a sealed manner, e.g. they are welded together. Alternatively, they can also be manufactured monolithically from one component.

The invention claimed is:

1. A method for the manufacture of at least one measuring tube for a measuring device with at least one measuring transducer for registering at least one measured value of at least one process variable, wherein the measuring transducer is connectable with the first measuring tube at a first interface of the measuring tube, the method comprising the step of:
    producing at least one necked out portion of the measuring tube with the first interface of a predetermined shape and size by means of deforming the measuring tube.

2. The method as claimed in claim 1, wherein:
    at least two measuring tubes of different nominal diameters and in each case with at least one necked out portion with a first interface are produced in such a manner, that the two first interfaces of the necked out portions of the at least two measuring tubes have an approximately identical shape and size.

3. The method as claimed in claim 1, wherein:
    the necked out portion of the measuring tube is produced by means of collar drawing.

4. The use of a measuring tube as claimed in claim 1, for manufacturing a measuring device having at least one measuring transducer for registering at least one measured value of at least one process variable, wherein:
    the first interface of the necked out portion is connected with a second interface of the measuring transducer of a predetermined shape and size in a material-bonded, force-interlocking or shape-interlocking manner.

5. The use as claimed in claim 4, wherein:
    said measuring transducer is welded on an end of said necked out portion.

6. The use as claimed in claim 4, wherein:
    said necked out portion is produced with an elliptical cross section of the end of said necked out portion and a predetermined nominal width of said end of said necked out portion;
    said measuring transducer is produced with an elliptical cross section for a tubular connection side of said measuring transducer and a predetermined nominal width for the connection side of said measuring transducer, the predetermined nominal widths of said connection side of said measuring transducer and said end of said necked out portion are essentially identical.

7. A measuring device comprising:
    a measuring tube, which has at least one necked out portion, on which at least one measuring transducer is arranged for registering at least one measured value of at least one process variable, wherein:
    said measuring tube together with said necked out portion is monolithic; and
    said necked out portion is manufacturable from said measuring tube at least partially by a deformation method.

8. The measuring device as claimed in claim 7, wherein:
    said measuring tube has an elliptical cross section.

9. The measuring device as claimed in claim 7, wherein:
    said measuring tube is produced from metal or a metal alloy.

10. The measuring device as claimed in claim 7, wherein:
    said necked out portion has an approximately planar end.

11. The measuring device as claimed in claim 7, wherein:
    said necked out portion has an elliptical cross section of the end of said necked out portion.

12. The measuring device as claimed in claim 7, wherein:
    said necked out portion has an approximately constant wall thickness at the end of said necked out portion.

13. The measuring device as claimed in claim 7, wherein:
    said measuring transducer is welded with said necked out portion and seals an opening in said measuring tube formed by said necked out portion.

14. The measuring device as claimed in claim 7, wherein:
    measuring transducer protrudes at least partially into said necked out portion and is contactable by measured medium in said measuring tube.

15. The measuring device as claimed in claim 7, wherein:
    measuring device has at least two equally constructed, necked out portions, on which an ultrasonic transducer is in each case arranged; and
    said two ultrasonic transducers are of equal construction.

* * * * *